No. 818,782. PATENTED APR. 24, 1906.
W. S. PHELPS.
HYDRANT.
APPLICATION FILED JUNE 30, 1905.
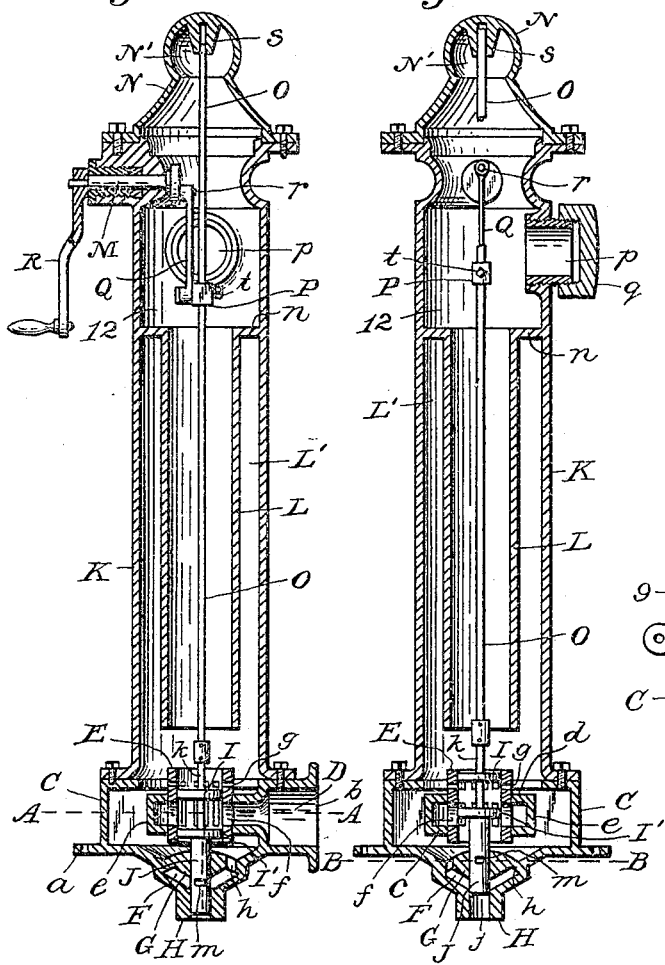
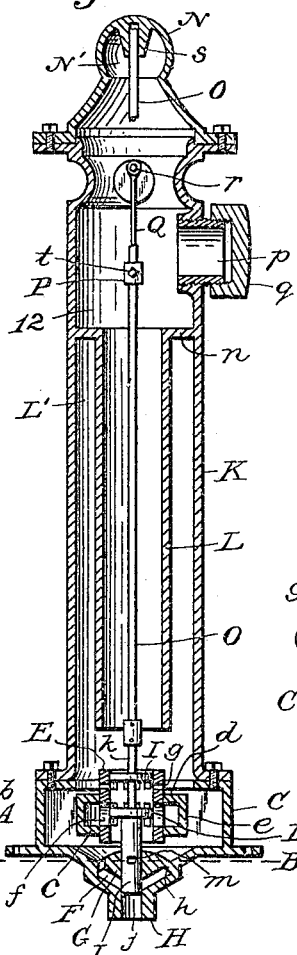
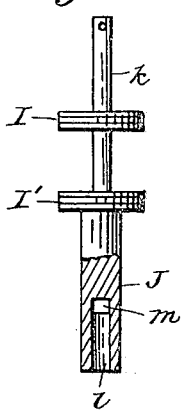
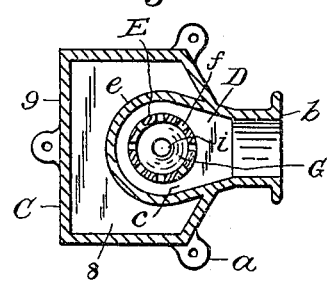
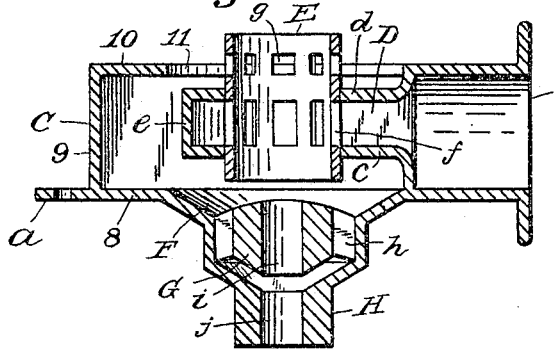
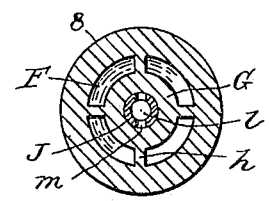
Witnesses:
Wm C Thompson
Stella Snider
Inventor:
Walter S. Phelps,
by E. T. Silvius,
Attorney.

UNITED STATES PATENT OFFICE.

WALTER SCOTT PHELPS, OF MUNCIE, INDIANA.

HYDRANT.

No. 818,782.  Specification of Letters Patent.  Patented April 24, 1906.

Application filed June 30, 1905. Serial No. 267,709.

*To all whom it may concern:*

Be it known that I, WALTER SCOTT PHELPS, a citizen of the United States, residing at Muncie, in the county of Delaware and State of Indiana, have invented new and useful Improvements in Hydrants; and I do declare the following to be a full, clear, and exact description of the invention, reference being had to the accompanying drawings, and to the letters of reference marked thereon, which form a part of this specification.

The invention relates to hydrants that are designed to be used as fire hydrants or plugs and with slight modificationns may be adapted for domestic service, the invention having particular reference to the stand-pipe and to the valve and operating mechanism thereof.

Objects of the invention are to provide hydrants that may be constructed at relatively small cost and be efficient and not liable to freeze in use, while being adapted to be easily opened and closed without causing excessive wear of the valves and operating mechanism thereof; to provide hydrants which may be opened and closed rapidly without danger of causing leaking joints of the hydrant and connecting piping, and to provide hydrants that may be quickly and thoroughly drained and when in use adapted to prevent freezing of water therein.

Other objects will become apparent by reference to the following detailed description of the invention.

The invention consists in a hydrant having novel forms and arrangements of valves and operating and controlling devices therefor and having a stand-pipe of novel construction; and, further, the invention consists in the parts and combinations and arrangements of parts, as hereinafter particularly described, and pointed out in the appended claims.

Referring to the drawings, Figures 1 and 2 are vertical central sectional views on different vertical planes of a hydrant constructed substantially in accordance with the invention, the main valve being closed in Fig. 1 and open in Fig. 2; Fig. 3, an elevation of the main valve and the drain-valve attached thereto, the latter being partly in section; Fig. 4, a horizontal sectional view on the line A A in Fig. 1, omitting the main valve; Fig. 5, a vertical central sectional view of the valve-box and valve-cylinders therein, omitting the valves; Fig. 6, a horizontal sectional view on the line B B in Fig. 2, and Fig. 7 an end view of the drain-valve and main valve.

Similar reference characters in the various figures of the drawings designate corresponding elements or features.

In a practical embodiment of the invention a valve-box C, preferably of cast-iron, is provided, which serves also as a base and is provided with suitable apertured ears $a$ for securing the whole hydrant to a foundation, if desired. The valve-box comprises a bottom 8, sides 9, and a top 10, and has an open inlet end $b$, adapted to be connected to a supply-pipe. Within the valve-box is a chamber D, formed of walls $c, d,$ and $e$ and open to the inlet end $b$ of the valve-box. A valve-cylinder E, preferably of brass, is suitably secured in the valve-box directly to the walls $c$ and $d$, extending through both walls and the chamber D, the cylinder having ports $f$, preferably extending from the wall $c$ to the wall $d$ and relatively shorter ports $g$ in the sides thereof, opening outside of the chamber D into the main portion of the valve-box, which has an opening 11 in its top 10, through which the water may pass from the valve-box. A basin F is formed in the bottom of the valve-box, and in the basin a drain-valve cylinder G is supported by bridges $h$, there being water-passages about and under the cylinder. A drain-valve cylinder H is attached to the bottom of the basin, and the cylinder G has a bore $i$ and the cylinder H a bore $j$ in alinement one with the other.

The main valve comprises two pistons I and I', having suitable water-tight packing-rings and secured to a valve-stem $k$, and the drain-valve J is attached also to the stem $k$, being preferably integral therewith and also with the piston I', and it is of plunger form, having a bore $l$ extending from its end inwardly and a lateral port $m$ extending from the bore through the wall of the valve. The main valve is movable in the cylinder E, and the drain-valve extends through the cylinder G into the cylinder H and is movable therein.

The stand-pipe of the hydrant comprises a hollow column K, which is bolted to the valve-box C and is preferably composed of cast-iron, the column having a transverse partition $n$, having a central opening at which a tube L is attached to the partition and extends nearly to the valve-box, so that an air-chamber L' is formed in the stand-pipe about the tube, the tube serving as a water-channel to the upper portion of the stand-pipe which has a receiving-chamber 12 therein above the partition $n$, the chamber having an outlet-opening $p$, closed when not in use by a cap $q$, the opening preferably having a brass bush in it to which the cap may be screwed and to which a hose may be connected when the cap is removed. Obviously, if desired for domestic purposes, a spout may be applied at the opening. The air-chamber serves as a frost-jacket.

A rotative shaft M is mounted in the wall of the stand-pipe at or above the receiving-chamber and is preferably packed against leakage, the shaft carrying a crank-pin $r$ on the inner end thereof at one side of the longitudinal axis of the stand-pipe. A cap N is attached removably to the top of the hollow column and forms part of the stand-pipe, providing an air-chamber N' in the top thereof above the receiving-chamber, the cap having a guide $s$, into which extends a valve-rod O for operating and controlling the main valve and the drain-valve simultaneously, the valve-rod being suitably attached to the valve-stem $k$ and extending through the tube L. A wrist-pin head P is attached to the valve-rod O by means of a set-screw $t$, and a connecting-rod Q is pivoted thereto and also to the crank-pin $r$ for the operation of which a lever R is attached to the shaft M and preferably may be detachable. For convenience the lever may extend downwardly when the main valve is closed and upwardly when the valve is open, thus serving as a convenient indicator. The crank-pin also serves as a gage-stop for the valves in both open and closed positions.

In practical use when the crank-pin $r$ is moved so as to reach its limit of travel downwardly the main valve will be closed with the piston I above and the piston I' thereof below the ports $f$, so that the water will enter from the chamber D into the cylinder E between the pistons, the valve being in balance and preventing the water from escaping into the main portion of the valve-box. At the same time the drain-valve is open, the port $m$ thereof being between the cylinders G and H, receiving the water from the basin F, that may have been left in the stand-pipe, the water draining through the bore $l$ into the ground or elsewhere, as may be designed. If the crank-pin $r$ be moved to the opposite point of its throw, as in Fig. 2, the piston I will be moved above the ports $g$, permitting the water to escape into the main part of the valve-box, the piston I' will be moved to a point intermediate the ends of the ports $f$ and permit the water to flow through them beneath the piston and out of the lower end of the cylinder E into the main portion of the valve-box, the water at the same time flowing through the upper portions of the ports $f$ above the piston I' and out through the ports $g$, being deflected thereto by the upper piston I of the valve, the valve being held in balance by reason of the water-pressure being equally exerted between and against both pistons of the valve irrespective of the controlling influence of the valve-operating devices. The water escaping through the opening 11 into the stand-pipe will be cushioned by the air in the air-chamber L' and then by the air in the air-chamber N', thus preventing shocks by the rushing water under pressure. The "dead-air" in the chambers also serves as frost-jackets. While the main valve is open the drain-valve is moved so that its port $m$ is closed in the cylinder G and the lower end of the valve closes the bore of the cylinder H. After closing the main valve the water remaining in the stand-pipe will rapidly flow out through the drain-valve before the cold can cause the water to freeze or congeal, the movement of the water being accelerated by the expanding air in the air-chambers and by air entering the outlet-opening $p$ when opened.

Other operations and actions will be understood from the foregoing description.

Having thus described the invention, what is claimed as new is—

1. A hydrant including a valve-box having a chamber therein to receive from a supply-pipe, a valve-cylinder extending through the chamber and having long ports opening into the chamber and also relatively shorter ports opening into the main portion of the valve-box exterior to the chamber, and a valve movable in the valve-cylinder and having two pistons spaced apart a distance approximately equal to the length of either of the long ports.

2. A hydrant including a valve-box having a chamber therein to receive from a supply-pipe, a main-valve cylinder extending through the chamber and having ports therein, a basin at the bottom of the valve-box, a drain-valve cylinder attached to the bottom of the basin, a drain-valve cylinder supported by bridges in the basin, and a main valve in the main-valve cylinder and having a drain-valve attached thereto and extending through one and into the other one of the drain-valve cylinders.

3. A hydrant including a valve-box having a main valve therein and a basin below the valve, a drain-valve attached to the main valve and having a bore therein and a lateral port to the bore, a drain-valve cylinder in the basin, a drain-valve cylinder beneath the basin, a stand-pipe attached to the valve-box, a rotative shaft mounted in the wall of the stand-pipe and carrying a crank-pin, and operative connections between the main valve and the crank-pin.

4. A hydrant including a valve-box having a basin in the bottom thereof, a main-valve cylinder in the valve-box, a drain-valve cylinder in the basin of the valve-box, a drain-valve cylinder beneath the basin of the valve-box, a main valve in the main-valve cylinder, a drain-valve attached to the main valve and extending through one and into the other one of the drain-valve cylinders, the drain-valve being open when the main valve is closed and closed when the main valve is open, a stand-pipe attached to the valve-box and having a receiving-chamber therein, an air-chamber below the receiving-chamber, an air-chamber above the receiving-chamber, a guide in the top of the stand-pipe, a valve-rod attached to the main valve and extending into the guide, a rotative shaft mounted in the stand-pipe and carrying a crank-pin, and a connecting-rod pivotally connected to the crank-pin and also with the valve-rod.

In testimony whereof I affix my signature in presence of two witnesses.

WALTER SCOTT PHELPS.

Witnesses:
  A. W. RITTER,
  WALTER J. LOTZ.